Feb. 27, 1951     W. D. BUCKINGHAM     2,543,227
CONCENTRATED ARC LAMP
Filed Oct. 15, 1948     2 Sheets-Sheet 1
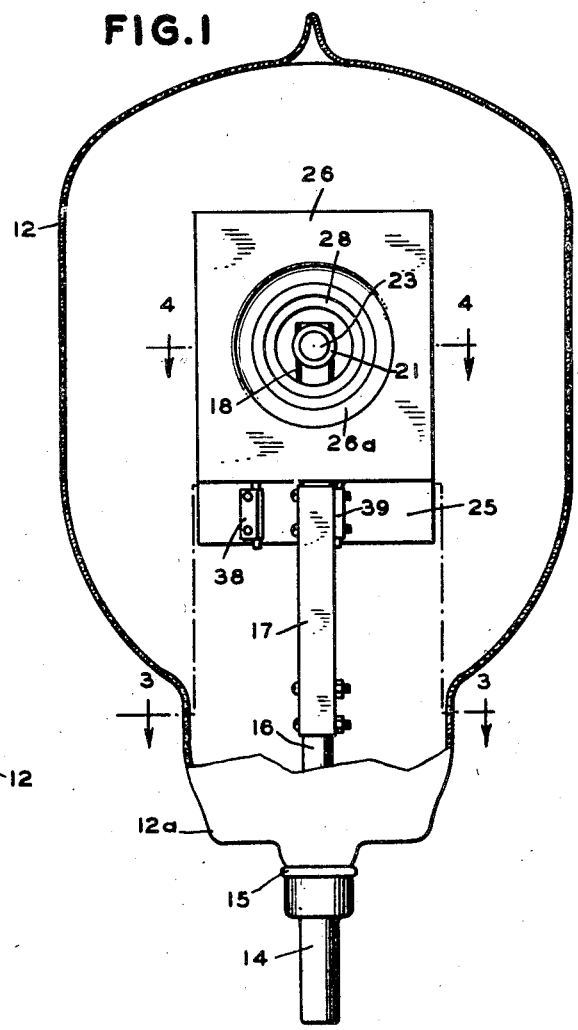
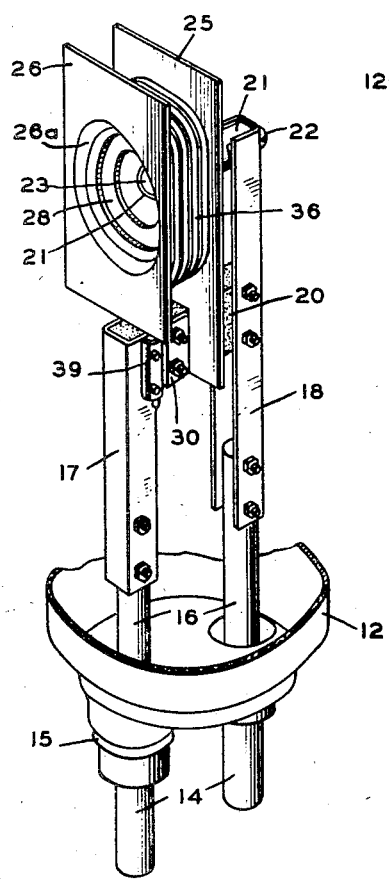
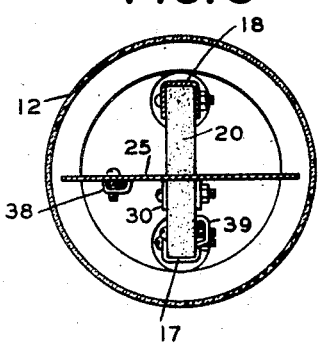
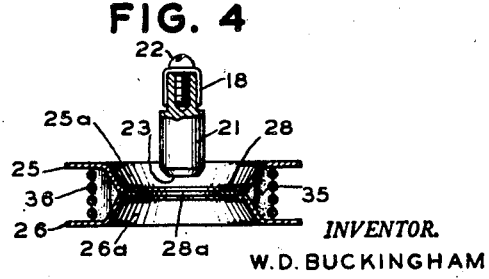
INVENTOR.
W. D. BUCKINGHAM
BY
ATTORNEY

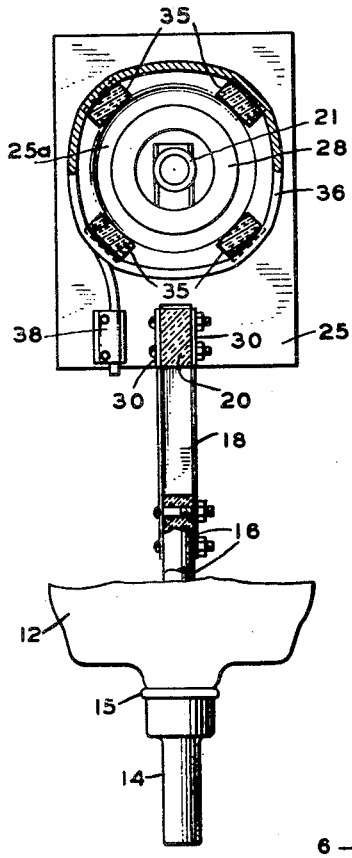
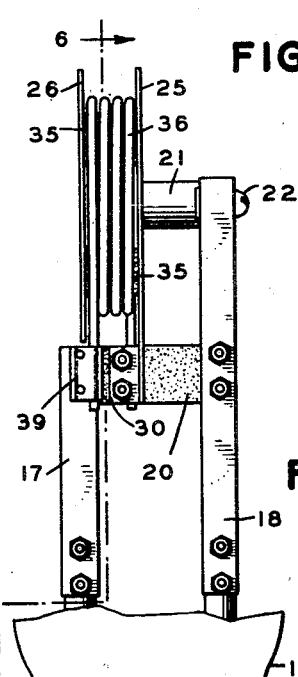
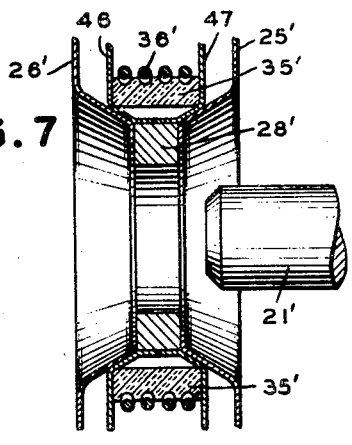
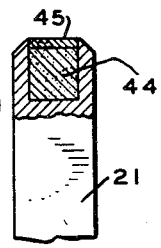
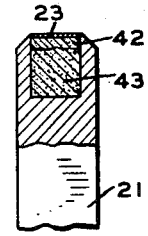
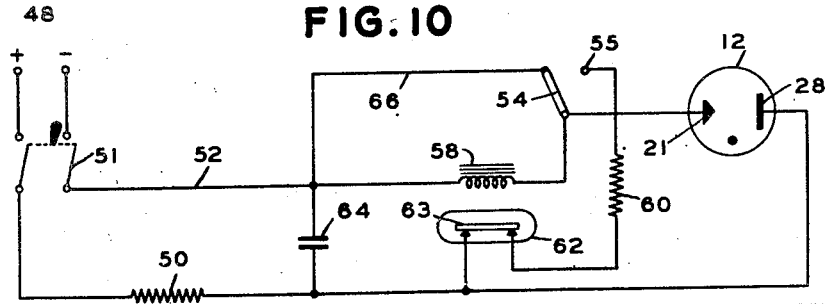

Patented Feb. 27, 1951

2,543,227

UNITED STATES PATENT OFFICE 2,543,227

CONCENTRATED ARC LAMP

William D. Buckingham, Southampton, N. Y., assignor to The Western Union Telegraph Company, New York, N. Y., a corporation of New York Application October 15, 1948, Serial No. 54,780

6 Claims. (Cl. 176—122)

This invention relates to an arc discharge device in which the cathode has an active fused surface film that is formed and rendered highly incandescent by an arc of high current density that is concentrated thereon when the device is in operation and which produces a concentrated source of white light of high intrinsic brilliancy, and more particularly to an improved flood lamp or spotlight for photographic and projection purposes. The arc discharge device is of the type disclosed in the Buckingham and Deibert Patent No. 2,453,118, issued November 9, 1948, the disclosure of which is incorporated herein by reference.

In the use of light sources for photographic purposes, such as flood lamps or spotlights employed in studios, it is highly desirable that a uniform color temperature of the light source be maintained. Thus, for taking black and white pictures, as in moving picture work, it is desirable that the relative percentages of the various color components of the light, which include both the actinic and visible rays, remain constant so that the proper light exposure and color balance can be determined and reproduced for subsequent scenes at a later date to insure that correct exposure is obtained. In black and white photography different colors should come out as different variations of gray, so that if a light source should be used which is weak in the blue and strong in the red, a different effect would be obtained from that where the light source was strong in the blue and weak in the red portions of the spectrum. If a light source is used which changes over a period of time in its color temperature, then the values on the film will change.

In color photography correct rendition of the colors is the prime objective; they should look the same on the film as they do to the eye. If a light source is used which is weak in the blue portion of the spectrum, then the blues will appear darker than they should since we photograph by reflected light. So it is important that the color temperature of the light source used in taking and projecting colored photographs be known and remain constant; it is for that reason that each type of color film is specified to be used with a light of a given color temperature.

In motion picture photography heretofore tungsten flood lamps have generally been used, but these lamps are subject to serious disadvantages. They have a very short useful life, usually about ten hours, and their color temperature changes continuously during the entire period of their life, and it is very difficult to maintain the color temperature constant by means of filters or by changing the current flowing through the tungsten filament. Also, if it is desired to vary the intensity of the illumination on a scene to obtain a desired effect in the film, for example, as from simulated daylight scenes to twilight scenes, it is necessary with tungsten lamps either to move the light source towards or away from the scene or to put non-selective light filters such as wire mesh over the lamp. This is highly inconvenient, but the intensity of a tungsten lamp cannot be changed by changing the value of the current flowing in its circuit since this also changes the color temperature of the lamp. With a lamp in accordance with the instant invention the current flowing through the lamp may be varied to any desired extent and hence any desired degree of light intensity may be obtained, without materially changing the color temperature of the lamp. This is because when the current flowing through the lamp is varied, all that happens is that the size of the spot of light, and hence the quantity of light output, is changed. Moreover, a lamp in accordance with this invention has a useful life which is many times longer than the life of a tungsten lamp of comparable size; life tests have shown that a 1 kilowatt lamp of the character disclosed herein has a useful life of 1000 hours or longer, which is of the order of one hundred times greater than the useful life of a tungsten filament lamp of the same size used for photographic lighting purposes.

The lamp of the instant invention also develops considerably less external heat than that developed with tungsten lamps, and in television studios where high intensity and large quantities of illumination are required, it is highly desirable that the heat be reduced as much as possible since it not only tends to spoil the make-up on the faces of the actors but also has an exhausting effect which makes it difficult for the principals to act for any considerable period of time under such conditions.

One of the objects of the present invention is to provide a lamp suitable for photographic illumination purposes in which various of the disadvantages of the tungsten lamps heretofore employed are obviated, and which has a much longer life than a tungsten lamp of comparable size.

Another object is a lamp of the character described which has a high and substantially constant color temperature throughout the life of the lamp.

A further object is a lamp in which the intensity of its illumination may be varied by varying the current flowing through the lamp without substantially changing its color temperature.

Another object is to provide a concentrated arc lamp which may be made in large sizes and in which the anode does not become overheated notwithstanding that currents of large values are passed through the lamp.

Still another object is improved electrode structure in concentrated arc lamps of the larger sizes.

Other objects and advantages will be apparent from the following detailed description of an illustrative embodiment of the invention, taken in connection with the accompanying drawings, in which:

Fig. 1 is a front view, in elevation, of a 1 kilowatt concentrated arc lamp constructed in accordance with the invention;

Fig. 2 is a perspective view of the front and side portions of the lamp of Fig. 1, with the glass envelope broken away;

Fig. 3 is a sectional view taken along line 3—3 of Fig. 1;

Fig. 4 is a sectional view taken along the line 4—4 of Fig. 1;

Fig. 5 is a side view of the lamp, with the envelope broken away;

Fig. 6 is a longitudinal sectional view taken along the line 6—6 of Fig. 5;

Fig. 7 is a fragmentary view of the electrode structure suitable for concentrated arc lamps of sizes larger than 1 kilowatt;

Figs. 8 and 9 respectively are detail views of different forms of cathode structures for the lamp; and Fig. 10 shows a suitable power supply circuit for operating the lamp from a source of direct current.

Referring particularly to Figs. 1 to 6 of the drawings, the embodiment there illustrated comprises a sealed envelope 12 composed of a glass, quartz or other suitable heat-resistant transparent material. The lamp terminals may comprise copper thimbles 14 of the type disclosed in Kruh et al. Patent 1,564,690, issued December 8, 1925. Each thimble has a ring 15 of glass sealed to both the inner and outer edges of the rim of the thimble which tapers down to a thin edge as in Housekeeper Patent 1,294,466, issued February 18, 1919, or Kirwer Patent 1,716,140, issued June 4, 1929. The base or terminal part 12a, Fig. 1, of the lamp may be made as a separate glass body and the electrode structure mounted directly thereon, after which the glass body is sealed to the neck of the envelope proper.

Received within and supported by the thimbles 14 are lead-in posts 16 of molybdenum or other suitable metal, which posts at their lower ends are silver-soldered to the thimbles 14. Secured to the upper ends of the posts 16, as by machine screws or bolts, are channel-shaped upright members 17 and 18 which preferably are of molybdenum. A bridging support member 20 of refractory insulating material is clamped within the channel members 17 and 18. The member 20 conveniently may be made by cutting a piece of natural soapstone, which may easily be shaped to the proper size, and drilling the holes to receive the machine screws; the piece of soapstone thus formed is then heated to a temperature of approximately 1800° F. to produce lava which is highly refractory and also is a good insulator.

A cathode pencil or tube 21 extends transversely with respect to the anode structure, the member 21 being mechanically and electrically secured to and carried by the upper end of the channel member 18 by a machine screw 22. The front end of the cathode pencil 21 comprises the active fused surface film 23, Figs. 1, 2 and 4, hereinafter described in detail.

The anode structure includes two heat-dissipating plate members 25 and 26 having concave or dish-shaped portions 25a and 26a disposed in opposed relation to each other and having round central openings therein, as seen in Fig. 4. Tungsten, tantalum and molybdenum commonly are used for anode structures because of their high melting and volatilization point temperatures. Of these, however, tantalum has relatively low thermal conductivity; tungsten makes excellent anodes but is difficult to work; and hence molybdenum is preferred for the heat-radiating plate members 25 and 26. A ring or washer 28 of tungsten is inserted between the dish-shaped portions 25a and 26a so that the arc strikes to the inner circular edge 28a of the washer when the lamp is in operation instead of striking to either of the molybdenum plates. Molybdenum is not readily susceptible of being welded to tungsten and therefore the inner edges of the two dish-shaped portions 25a and 26a are soldered by nickel to the tungsten washer 28; thin nickel washers may be inserted between the edges of the respective members and when the assembly is heated during the initial formation of the active cathode surface film in a manner hereinafter described, the thin nickel washers will melt and solder the elements 25a, 26a and 28 to each other.

The anode structure is mounted by means of the plate member 25 which has its lower portion firmly secured to the lava block 20, as by machine screws which pass through the block and two bent tongues 30, Figs. 3 and 5, that are punched from the plate on either side of the block. The bottom of the front plate 26 is spaced above the upper end of the channel member 17 so as not to contact the latter member.

Spaced between the dish-spaced portions 25a and 26a, Figs. 4 to 6, are four refractory insulating pieces 35 having grooves in their outer faces that receive and support the adjacent turns of a wire coil 36, the turns of the coil holding the insulating blocks in position. The blocks conveniently may be made by cutting and grooving pieces of soapstone, after which the soapstone is heated to produce lava as in the case of the insulating piece 20. One end of the coil 36 is clamped at 38, Figs. 1 and 6, to the lower portion of the larger plate 25 to provide a good electrical connection thereto, while the other end of the coil is clamped at 39, Figs. 2 and 5, to the channel member 17 to provide a good electrical connection to this member. These connections cause the current traversing the arc stream to also flow through the coil 36 and set up a magnetic field to cause the arc stream to rotate rapidly around the inner periphery 28a of the tungsten washer in a manner and for the purpose hereinafter described.

Fig. 8 is a fragmentary view of a cathode pencil 21 formed from a rod of tantalum, molybdenum or like metal having high melting and volatilization point temperatures. In the end of the rod 21 a hole has been drilled which extends inwardly a distance of approximately three-eighths of an inch, and this hole is filled with an electron emissive material which is inserted and treated in a manner hereinafter disclosed so as to form the cathode. The filling material, when properly treated or activated, has the characteristic of being a good electron emissive substance at very high temperatures only; as disclosed in the aforesaid Buckingham et al. patent an important characteristic of a substance which will give optimum results is that it is not a sufficiently good electron emitter at lower temperatures to cause electrons to be emitted in sufficient quantity to support an arc of high current density until the material, or at least the surface 23 thereof, has reached incandescent temperatures, well above the melting point of the base metal of which the substance is composed. Preferably, zirconium oxide or hafnium oxide is employed as the electrode material. Either of these oxides or a mixture thereof, in the form of oxide powder, is packed into the hole in the cathode pencil 21. After the hole has been filled to the top thereof with the oxide powder, the electrode assembly is inserted within the glass envelope of the lamp. The envelope and assembly are connected to a vacuum pump and heated in an oven to a temperature of approximately 900° F., the heating being effected while the envelope is evacuated to as high degree as practicable, for example, evacuated down to a fraction of a micron of mercury pressure. The envelope and assembly are removed from the oven, while maintaining the high vacuum thereon, and treated further to assure the degassing of the various parts, as by inserting the envelope and electrode assembly within a high frequency coil for heating and treating the same.

After the heating and degassing operations above referred to, the envelope is filled with a suitable gas or vapor which is inert with respect to the material of the electrodes, such as neon, argon, krypton, and the like. Argon is preferred because it operates exceedingly well in the tube when used as a source of an intense light, and also enables a lower starting voltage to be employed than do others of the inert gases. The gas pressure in the envelope preferably is of the order of one atmosphere when the lamp is in operation.

The cathode is activated or formed by connecting the anode of the tube in circuit with a suitable source of direct current of adjustable potential; for example, so that potentials up to 1000 volts may be obtained. In one side of the forming circuit is connected a variable resistance so that the resistance of the circuit may progressively be reduced. Starting with a high value of resistance in the circuit the voltage is gradually increased until an arc discharge appears, the arc striking between the anode and the end 23 of the cathode. After a few seconds the cathode tube 21 becomes red hot and heats the oxide packed in it to a temperature where the oxide becomes electrically conducting. The arc then strikes between the anode and the oxide and raises the temperature of the surface 23 of the oxide to or above its melting point, so that the molten oxide on the surface flows and bonds itself to the sides of the metal tube 21, forming a smooth glassy surface on the end of the cathode material.

Under the intense ionic bombardment of the arc some of the oxide in molten state is reduced or decomposed to metallic zirconium or hafnium depending upon which oxide, zirconium or hafnium, was packed in the cathode pencil, forming a very thin layer of such metal over the surface of the cathode. Either zirconium metal or hafnium metal is a better electron emitter at high temperatures than is its oxide, and it also has a lower melting temperature; thus as soon as the metallic zirconium or hafnium surface layer is formed, the temperature of the cathode drops slightly and the underlying oxide solidifies and supports the film of molten metal on its surface. It is this film of molten metal which appears to be the chief source of the visible radiation from the lamp. The film, once initially formed as above set forth, remains to be heated and to become incandescent whenever the lamp is relighted. The film is so thin that apparently surface tension holds it to the oxide backing so that the lamp may be burned in any position. The film 23 of Fig. 8 is supported by the semi-fused layer of oxide 42 immediately beneath, and this layer merges into the white powder 43 of the original oxide. The oxide powder 43, and also to some extent the semi-fused layer 42, thermally insulates the active surface layer 23 to the extent that it reaches a temperature which is much higher than the melting point of the metal of which the oxide is composed. For a one-kilowatt size lamp of the form illustrated, the outside diameter of the cathode pencil 21 is approximately ½"; the inside diameter of the aperture is approximately ⅛"; and the diameter of the active spot or incandescent film 23 is approximately ¼"; as above stated the filling is approximately ⅜" deep.

Hafnium oxide produces in certain respects a better light than does zirconium oxide, but it costs considerably more than zirconium oxide. Therefore, as shown in Fig. 9, the hole in the cathode pencil 21 may be largely filled with a mass 44 of a material, such as magnesium oxide, which tends to thermally insulate the hafnium oxide. On top of the magnesium oxide is packed a mass of hafnium oxide as indicated at 45, which mass need be only ⅛" to ⅛" thick. It will be understood that the hafnium oxide mass 45 embodies three different layers, namely, a surface film of hafnium metal, an underlying semi-fused hafnium oxide layer and the powdered hafnium oxide layer, generally in the manner of the zirconium and zirconium oxide layer shown in Fig. 8.

The anode of a concentrated arc lamp serves to locate and fix the positive end of the arc stream and, therefore, must dissipate the heat released there without getting hot enough to vaporize or to produce any considerable radiation due to its own incandescence, even at the point where the arc stream strikes. If any part of the anode becomes hot enough to vaporize, the vapor so released will migrate to the cathode and in time spoil the lamp. With a one-kilowatt lamp, and a voltage drop of approximately 20 volts across the lamp, the current flowing in the arc stream is approximately 50 amperes when the lamp is powered from a 110-volt source. This relatively large current ordinarily would soon heat the anode and cause vaporization of a portion of the anode and also incandescence of the anode. This is prevented, however, by the magnetic field which is set up by the coil 36, which magnetic field causes rapid rotation of the arc stream around the inner circular edge 28a of the tungsten washer embodied in the anode structure. Four turns of 1/10" molybdenum wire provide a suitable coil, giving a field intensity of approximately 40.5 lines of force per square centimeter at the center of the coil when a current of 50 amperes is flowing through the coil. The rotation of the arc is due to the fact that the arc stream acts like a conductor carrying a current, and in accordance with Ampere's law the arc experiences a force action which causes the arc stream to rotate rapidly around the inner circular edge 28a of the anode structure. The direction of the force action, and hence the direction of rotation of the arc stream, may be determined from the well known left-hand rule, i. e., if the thumb and first and second fingers of the left-hand are held in such position as to be at right angles to one another and the forefinger is made to point in the direction of the magnetic field set up by the coil while the second finger points in the direction of the current flowing in the arc stream, then the thumb will indicate the direction of the force. The rotation of the arc stream has three important advantages: (1) it prevents localization of heating of the anode, i. e., it distributes the heat over the anode surface so that it does not overheat or vaporize at any point; (2) it distributes the heat and hence the radiation of light more uniformly over the active portion of the cathode surface because it also rotates about the cathode surface; and (3) it controls the arc flame which would tend to shoot out in front of the cathode, with the likelihood of softening or melting the glass envelope, if it were not for the magnetic field produced by the coil 36.

In the operation of a one-kilowatt lamp such as hereinbefore described, it has been determined that the arc stream rotates at the rate of 180 times per second. This was determined by operating the lamp from a three-phase full-wave rectifier, so that a 360-cycle ripple appeared in the rectified current. By adjusting the current a stroboscopic effect was obtained in regard to the spokes extending between the projected image of the cathode and that of the hot anode, such that two dark areas and two light areas were projected onto a screen; since one revolution of the arc stream requires two cycles, it was evident that the arc stream was rotating at a speed of 180 revolutions per second or 10,800 revolutions per minute.

Fig. 7 illustrates an electrode structure for a 5-kilowatt size lamp. In this case, the outside diameter of the cathode pencil 21' is approximately ¾"; the inside diameter of the aperture is .55", and the active spot will almost fill this aperture. Since approximately 250 amperes will flow through a 5-kilowatt lamp, the tungsten ring 28' is made considerably heavier, and the magnetic coil may be composed of molybdenum wire having a diameter of .2". Two additional heat dissipating vanes 46 and 47 are added, thus giving four vanes 25', 26', 46 and 47, or four times the radiating surface of the 5-kilowatt lamp. The vanes 46 and 47 may be soldered by nickel to the tungsten washer 28'.

Fig. 10 shows a suitable starting and running circuit for the lamp when it is operated from a source of direct current supply 48. A ballast resistor 50 is inserted in the positive side of the circuit since the lamp has a negative-volt-ampere characteristic. With the main switch 51 closed, and switch 54 thrown to the contact 55, which is the starting position, direct current will flow over conductor 52, winding 58 of a vacuum switch 62, manually operable switch 54, contact 55, resistance 60, armature 63 and contacts of the vacuum switch 62, and the ballast resistor 50. The vacuum switch 62 is of the type in which the circuit is made and broken between solid contacts in a vacuum in response to the magnetic field set up by inductance 58, such a switch having been found to be unusually effective to provide the surge required in starting vapor arc lamps. Various kinds of such switches are well known; one suitable for the purpose is disclosed in the Ruth Patent No. 2,076,162, issued April 6, 1937, and also in the Buckingham et al. application Serial No. 35,928, filed June 29, 1948. The inductance coil 58 has an open air gap and hence a magnetic field which attracts the magnetizable bar or armature 63 of the switch 62, opening the circuit formerly through the switch contacts and interrupting the current. When the current is interrupted, an inductive pulse generated across the inductance 58 breaks down the arc gap in the lamp and the lamp becomes operative. The condenser 64 readily permits the voltage surge to pass to the anode 28 of the lamp. The lamp current flowing through inductance 58 holds the armature 63 of the switch in the open position, and switch 54 can then be thrown to the operating position, i. e., to the left as viewed in Fig. 10, thereby shunting out the inductor 58. Various other suitable starting and running circuits for the concentrated arc lamp may, of course, be employed in lieu of the illustrative circuit shown in Fig. 10.

While there is shown and described herein a preferred embodiment of the invention, many other and varied forms and uses will present themselves to those versed in the art without departing from the invention which is, therefore, not limited either in structure or in use except as indicated by the scope of the appended claims.

I claim:

1. A concentrated arc discharge lamp comprising a metallic anode and a cathode disposed in an ionizable gaseous medium having a pressure of the order of one atmosphere or more at the operating temperature of the lamp, means including said cathode for causing the color temperature of the lamp to remain substantially constant throughout the life of the lamp and for enabling the quantity of light output to be varied by varying the current flowing through the lamp without substantially changing its color temperature, the cathode having a restricted fused surface portion formed by an arc of high current density which is concentrated thereon when the lamp is in operation, said fused surface portion comprising a molten incandescent film of a metal of the class consisting of zirconium and hafnium when the lamp is in operation, means comprising a body of a refractory substance beneath and supporting said incandescent film and having low thermal conductivity and a melting point above that of said metal for maintaining the temperature of said incandescent film considerably above the melting point of the metal to greatly increase its thermionic emission properties to support the arc of high current density, and means operative to prevent localization of heating of the metallic anode and to distribute the radiation of light more uniformly over the active portion of the cathode surface comprising a coil of wire positioned adjacent to the arc stream and connected in circuit with a source of current which flows therein for setting up a magnetic field in a direction to induce rapid rotation of the arc over the surface of the anode and about the cathode surface.

2. A concentrated arc discharge lamp comprising a metallic anode structure and a cathode disposed in an ionizable gaseous medium having a pressure of the order of one atmosphere or more at the operating temperature of the lamp, said cathode having a restricted fused surface portion formed by an arc of high current density which is concentrated thereon when the lamp is in operation, said fused surface portion comprising a molten incandescent film of a thermionically emissive metallic substance when the lamp is in operation, means comprising a body of a refractory substance beneath and supporting said incandescent film and having low thermal conductivity and a melting point above that of said metallic substance for maintaining the temperature of said incandescent film considerably above the melting point of the metallic substance to greatly increase its thermionic emission properties to support the arc of high current density, said anode structure comprising at least two heat-radiating metal plate members having annular concave portions disposed in opposed relation to each other with their concave surfaces facing outwardly, said anode structure having an opening therein on which the arc terminates, and means operative to prevent localization of heating of the metallic anode and to distribute the radiation of light more uniformly over the active portion of the cathode surface comprising a coil of wire positioned between said plate members and connected in circuit with the arc to cause current flowing in the coil to set up an electromagnetic field and induce rapid rotation of the arc around said opening of the anode structure and about the cathode surface.

3. A concentrated arc discharge lamp comprising a metallic anode structure and a cathode disposed in an ionizable gaseous medium having a pressure of the order of one atmosphere or more at the operating temperature of the lamp, said cathode having a restricted fused surface portion formed by an arc of high current density which is concentrated thereon when the lamp is in operation, said fused surface portion comprising a molten incandescent film of a thermionically emissive metallic substance film when the lamp is in operation, means comprising a body of a refractory substance beneath and supporting said incandescent film and having low thermal conductivity and a melting point above that of said metallic substance for maintaining the temperature of said incandescent film considerably above the melting point of the metallic substance to greatly increase its thermionic emission properties to support the arc of high current density, said anode structure comprising at least two heat-radiating metal plate members having annular concave portions disposed in opposed relation to each other with their concave surfaces facing outwardly, said heat-radiating plate members having aligned openings therein and an anode member interposed between the plate members at said aligned openings and mechanically and electrically secured thereto, said anode member comprising a metal having high melting and volatilization point temperatures and having an opening therein on which the arc terminates, and means operative to prevent localization of heating of the metallic anode and to distribute the radiation of light more uniformly over the active portion of the cathode surface comprising a coil of wire positioned between said plate members and connected in circuit with the arc to cause current flowing in the coil to set up an electromagnetic field and induce rapid rotation of the arc around said opening of the anode member and about the cathode surface.

4. A concentrated arc discharge lamp comprising a metallic anode structure and a cathode disposed in an ionizable gaseous medium having a pressure of the order of one atmosphere or more at the operating temperature of the lamp, said cathode having a restricted fused surface portion formed by an arc of high current density which is concentrated thereon when the lamp is in operation, said fused surface portion comprising a molten incandescent film of a thermionically emissive metallic substance when the lamp is in operation, means comprising a body of a refractory substance beneath and supporting said incandescent film and having low thermal conductivity and a melting point above that of said metallic substance for maintaining the temperature of said incandescent film considerably above the melting point of the metallic substance to greatly increase its thermionic emission properties to support the arc of high current density, said anode structure comprising at least two heat-radiating metal plate members having annular concave portions disposed in opposed relation to each other with their concave surfaces facing outwardly, said anode structure having an opening therein on which the arc terminates, and means operative to prevent localization of heating of the metallic anode and to distribute the radiation of light more uniformly over the active portion of the cathode surface comprising a coil of wire positioned between said plate members and connected in circuit with the arc to cause current flowing in the coil to set up an electromagnetic field and induce rapid rotation of the arc around said opening of the anode structure and about the cathode surface, said coil being wound around and mounted on refractory insulating pieces disposed between and supported by the adjacent opposed portions of said metal plate members.

5. A concentrated arc discharge lamp comprising a metallic anode structure and a cathode disposed in an ionizable gaseous medium having a pressure of the order of one atmosphere or more at the operating temperature of the lamp, said anode structure and cathode being supported by anode and cathode terminal posts, said cathode having a restricted fused surface portion formed by an arc of high current density which is concentrated thereon when the lamp is in operation, said fused surface portion comprising a molten incandescent film of a thermionically emissive metallic substance when the lamp is in operation, means comprising a body of a refractory substance beneath and supporting said incandescent film and having low thermal conductivity and a melting point above that of said metallic substance for maintaining the temperature of said incandescent film considerably above the melting point of the metallic substance to greatly increase its thermionic emission properties to support the arc of high current density, said anode structure comprising at least two heat-radiating metal plate members having annular concave portions disposed in opposed relation to each other with their concave surfaces facing outwardly, said anode structure having an opening therein on which the arc terminates, and means operative to prevent localization of heating of the metallic anode and to distribute the radiation of light more uniformly over the active portion of the cathode surface comprising a coil of wire positioned between said plate members and connected in series with the arc to cause current flowing in the coil to set up an electromagnetic field and induce rapid rotation of the arc around said opening of the anode structure and about the cathode surface, one end of said coil being electrically connected to one of said metal plate members and the other end of the coil being electrically connected to the anode terminal post of the lamp.

6. A concentrated arc discharge lamp comprising a metallic anode structure and a cathode disposed in an ionizable gaseous medium having a pressure of the order of one atmosphere or more at the operating temperature of the lamp, anode and cathode terminal posts, said cathode being supported by the cathode terminal post and having a restricted fused surface portion formed by an arc of high current density which is concentrated thereon when the lamp is in operation, said fused surface portion comprising a molten incandescent film of a thermionically emissive metallic substance when the lamp is in operation, means comprising a body of a refractory substance beneath and supporting said incandescent film and having low thermal conductivity and a melting point above that of said metallic substance for maintaining the temperature of said incandescent film considerably above the melting point of the metallic substance to greatly increase its thermionic emission properties to support the arc of high current density, said anode structure comprising at least two heat-radiating metal plate members having annular concave portions mechanically connected in opposed relation to each other with their concave surfaces facing outwardly, said anode structure having an opening therein on which the arc terminates, means operative to prevent localization of heating of the metallic anode and to distribute the radiation of light more uniformly over the active portion of the cathode surface comprising a coil of wire positioned between and carried by said plate members and connected in series with the arc to cause current flowing in the coil to set up an electromagnetic field and induce rapid rotation of the arc around said opening of the anode structure and about the cathode surface, one end of said coil being electrically connected to one of said metal plate members and the other end of the coil being electrically connected to the anode terminal post of the lamp, and means for supporting said anode structure comprising a body of refractory insulating material extending between and secured to said anode and cathode terminal posts, one of said plate members being clamped to the body of insulating material.

WILLIAM D. BUCKINGHAM.

REFERENCES CITED

The following references are of record in the file of this patent:

UNITED STATES PATENTS

| Number | Name | Date |
| --- | --- | --- |
| 2,218,381 | Gooskens | Oct. 15, 1940 |
| 2,249,672 | Spanner | July 15, 1941 |
| 2,411,510 | Abadie | Nov. 26, 1946 |
| 2,438,181 | Morehead | Mar. 23, 1948 |
| 2,453,113 | Buckingham and Deibert | Nov. 9, 1948 |